United States Patent
Chapman (10) Patent No.: US 6,481,210 B1
(45) Date of Patent: Nov. 19, 2002

(54) SMART SURGE BLEED VALVE SYSTEM AND METHOD

(75) Inventor: Gregory J. Chapman, Scottsdale, AZ (US)

(73) Assignee: Honeywell International, Inc., Morristown, NJ (US)

(*) Notice: Subject to any disclaimer, the term of this patent is extended or adjusted under 35 U.S.C. 154(b) by 66 days.

(21) Appl. No.: 09/859,943

(22) Filed: May 16, 2001

(51) Int. Cl.[7] .................................................. F02G 1/00
(52) U.S. Cl. ............................. 60/772; 60/782; 60/784; 60/785
(58) Field of Search .......................... 60/772, 782, 794, 60/795, 785

(56) References Cited

U.S. PATENT DOCUMENTS

| | | |
|---|---|---|
| 3,981,466 A | 9/1976 | Shah |
| 4,251,985 A * | 2/1981 | Sullivan ........................ 415/27 |
| 4,380,893 A | 4/1983 | Stokes et al. |
| 4,428,194 A | 1/1984 | Stokes et al. |
| 4,550,564 A | 11/1985 | Callahan et al. |
| 4,655,034 A | 4/1987 | Kenison et al. |
| 4,756,152 A | 7/1988 | Krukoski et al. |
| 4,783,026 A | 11/1988 | Rumford et al. |
| 4,809,497 A * | 3/1989 | Schuh ........................ 417/280 |
| 4,989,403 A * | 2/1991 | Rodgers ........................ 60/785 |
| 5,042,245 A | 8/1991 | Zickwolf, Jr. |
| 5,117,625 A * | 6/1992 | McArthur et al. ............ 60/785 |
| 5,222,356 A | 6/1993 | Evenson et al. |
| 5,235,801 A | 8/1993 | Evenson et al. |
| 5,235,803 A * | 8/1993 | Rodgers ........................ 415/155 |
| 5,313,778 A | 5/1994 | Sweet et al. |
| 5,313,779 A * | 5/1994 | Rodgers ........................ 60/785 |
| 5,385,012 A * | 1/1995 | Rowe ........................ 60/779 |
| 6,141,951 A | 11/2000 | Krukoski et al. |

* cited by examiner

Primary Examiner—Charles G. Freay
Assistant Examiner—William H. Rodriguez
(74) Attorney, Agent, or Firm—Robert Desmond, Esq.

(57) ABSTRACT

A method and a system is provided for reducing aircraft engine fuel consumption by selectively closing an aircraft surge bleed valve (SBV), when the surge bleed valve would normally be open. The method determines whether the engine bleed flow obtained with the closed SBV is sufficient to prevent engine surge for the present flight regime. If so, the SBV is kept closed, while the aircraft is drawing air from the engine.

12 Claims, 8 Drawing Sheets

EXPECTED ECS FLOW +10% (PPM).

| AIRCRAFT ALTITUDE | SUPPLIED ECS ||
|---|---|---|
| | ONE | TWO |
| 0 | 23.76 | 38.17 |
| 8,500 | 23.32 | 37.62 |
| 13,600 | 22.99 | 36.96 |
| 21,400 | 22.22 | 35.75 |
| 27,100 | 21.45 | 34.54 |
| 31,500 | 20.68 | 33.33 |
| 34,900 | 19.91 | 32.01 |
| 38,200 | 19.14 | 30.80 |
| 41,400 | 18.37 | 29.59 |
| 45,000 | 17.60 | 28.38 |

FIG. 13

EXPECTED ECS FLOW −10% (PPM).

| AIRCRAFT ALTITUDE | SUPPLIED ECS ||
|---|---|---|
| | ONE | TWO |
| 0 | 19.44 | 31.23 |
| 8,500 | 19.08 | 30.78 |
| 13,600 | 18.81 | 30.24 |
| 21,400 | 18.18 | 29.25 |
| 27,100 | 17.55 | 28.26 |
| 31,500 | 16.92 | 27.27 |
| 34,900 | 16.29 | 26.19 |
| 38,200 | 15.66 | 25.20 |
| 41,400 | 15.03 | 24.21 |
| 45,000 | 14.40 | 23.22 |

SMART SURGE BLEED VALVE SYSTEM AND METHOD

BACKGROUND OF THE INVENTION

The present invention generally relates to turbine engines and, more particularly, to a method and system for improving aircraft fuel consumption by selectively closing one or more aircraft surge bleed valves when the surge bleed valves would normally be open.

Typically, high pressure ratio gas turbine engines require a variable engine air compressor geometry to avoid engine compressor surge. This variable geometry often includes the use of one or more surge bleed valves (SBV) for surge bleed. The surge bleed valve vents air from a compressor, increasing the distance between the engine operating line and the compressor surge line. The increased distance prevents compressor surge.

The aircraft also needs engine bleed for the environment control system (ECS) and wing de-icing. At any moment, the aircraft may or may not be extracting bleed air from the engine, as this is controlled by the ECS and the pilot. Like surge bleed, aircraft engine bleed requirements improve engine surge margin. However, use of the surge bleed via SBV and/or aircraft engine bleed causes increased fuel consumption at constant thrust.

As can be seen, there is a need for a method and system for improving aircraft fuel consumption by selectively closing one or more aircraft surge bleed valves when the surge bleed valves would normally be open and the aircraft is extracting bleed air from the engine.

SUMMARY OF THE INVENTION

In one aspect of the present invention, a method for reducing aircraft engine fuel consumption by selectively closing an aircraft surge bleed valve (SBV) when the surge bleed valve would normally be open, comprises of determining whether the engine bleed flow obtained with a closed SBV is sufficient to prevent engine surge for the present flight regime; and, if so, keeping the SBV closed while the aircraft is drawing air from the engine.

In another aspect of the present invention, a system for reducing aircraft engine fuel consumption by selectively closing an aircraft surge bleed valve (SBV) when the surge bleed valve would normally be open, comprises of means for determining whether the engine bleed flow obtained with the closed SBV is sufficient to prevent engine surge for the present flight regime; and means for keeping the SBV closed, while the aircraft is drawing air from the engine.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention is a Smart Surge Bleed Valve System and method for improving aircraft fuel consumption by selectively closing one or more aircraft surge bleed valves, when the surge bleed valves would normally be open.

The preferred embodiments of the present invention take advantage of the fact that when a surge bleed valve (SBV) is sized to have a flow size similar to the aircraft engine bleed requirements, then the SBV can be closed when it would normally be open, while the aircraft is drawing air from the engine. The net result is a reduction in engine fuel consumption, while retaining an acceptable compressor surge margin. When used during aircraft hold conditions, such operation can account for about a 4% decline of mission fuel burn.

Figure 1:
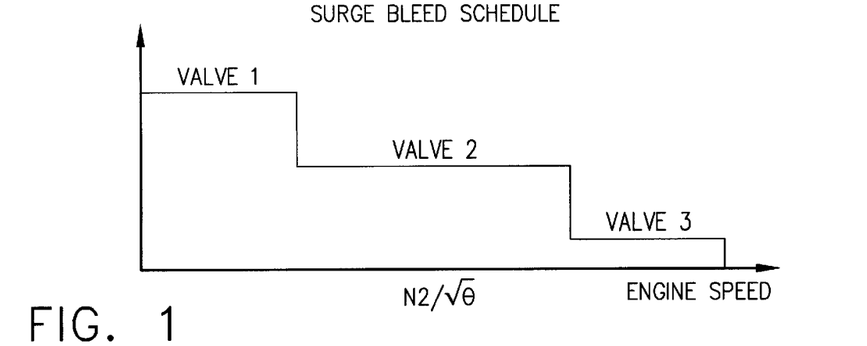
FIG. 1 depicts a typical surge bleed schedule for three separate bleed valves dependent on engine compressor speed.

FIG. 1 depicts a typical surge bleed schedule for three separate bleed valves, dependent on engine compressor speed. Each surge bleed valve may have a different flow size from any of the other surge bleed valves. The opening and closing of each surge bleed valve is usually scheduled and coordinated with compressor speed or compressor corrected speed. There may be a separate surge bleed valve scheduling for steady state and transient engine operation.

Figure 2:
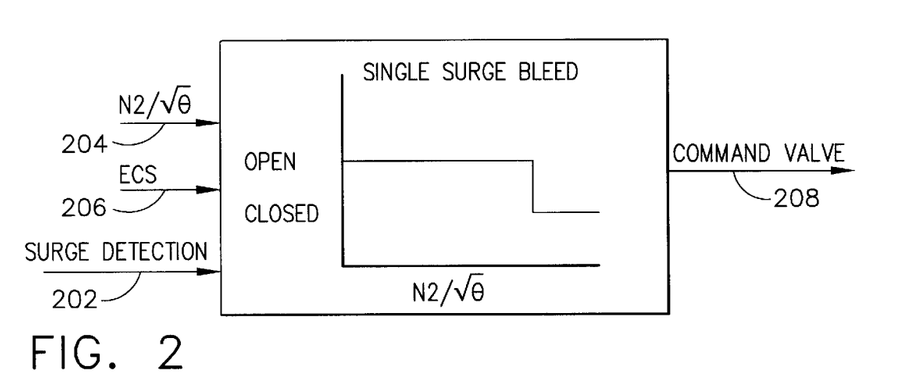
FIG. 2 depicts the Smart Surge Bleed Valve System with its logic input and output signals, according to a preferred embodiment of the present invention.

In the present invention, it is chosen that every individual surge bleed valve has its own schedule for opening and closing. The Smart Surge Bleed Valve System of the present invention requires several logic and measured inputs for surge bleed valve control, as shown in FIG. 2 for a single surge bleed valve. The inputs are as follows: surge detection 202, compressor speed 204, and three aircraft ECS and anti-ice system controlled logic inputs 206-ECS and/or aircraft anti-ice bleed turned on input, ECS and/or aircraft anti-ice bleed flowing input, and SBV selected for smart bleed open input. Each logic input can have either a True or False value.

The measured compressor speed 204 is used to determine the normal surge bleed valve position. If the surge detection 202 logic input is False, when ECS and/or aircraft anti-ice bleed input turned on input is True, the ECS and/or aircraft anti-ice bleed flowing input is True, and the SBV selected for smart bleed open input is True, the surge bleed valve is commanded to be closed by the system output valve command signal 208.

Therefore, based on the flight regime, such as takeoff and landing with gear down and locked, it can be determined when the engine SBV can be closed. This data is embedded into the engine control system. Conventionally, surge bleed valves are normally open at moderate to low engine power settings. Usually, the engines are at low power settings during the final decent and approach of an aircraft. Consequently, surge bleed is a source of noise during aircraft approach. The use of smart bleed with the Smart Surge Bleed Valve System of the present invention during aircraft approach offers a noise reduction, since the surge bleed valve that would normally be open is closed, thus eliminating the noise source.

In the unlikely event that the engine surges upon closure of the SBV during the Smart Surge Bleed Valve System operation, the use of the system of the present invention can be discontinued and the surge bleed valve would be opened for the remainder of the mission. Since any surge would likely occur at low engine power setting and, therefore, at low internal energy levels, any damage to the engine caused by the surge, produced due to the closed SBV, is extremely remote.

The Smart Surge Bleed Valve System of the present invention is preferably implemented within the engine control system, such as the Full Authority Digital Electronic Control (FADEC). It is used in conjunction with verified engine bleed status from the airframe to prevent excess bleed by the engine surge bleed system and to minimize thrust specific fuel consumption.

Figure 3:
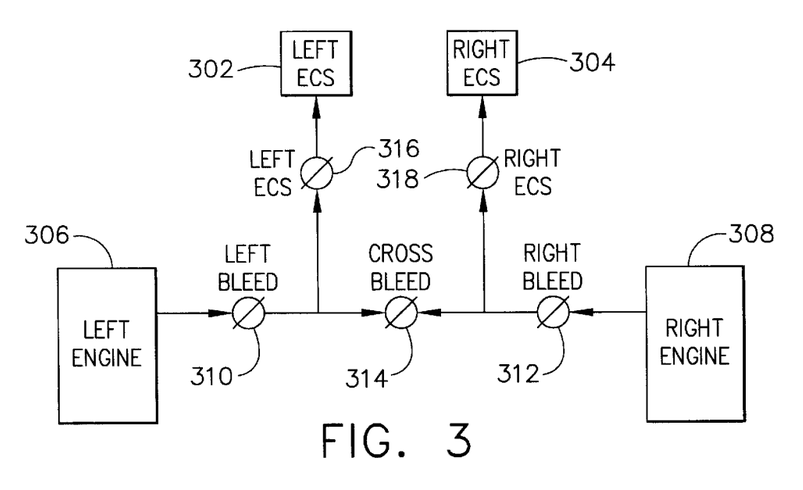
FIG. 3 shows a simplified block diagram of the conventional low pressure bleed air system of an aircraft.

FIG. 3 shows a simplified block diagram of the conventional low pressure bleed air system of an aircraft. Low pressure bleed air is supplied to the ECS 302, 304 by either or both engines 306, 308. The selection of the source of the ECS bleed air is controlled in the cockpit, which regulates opening and closing of engine bleed valves 310, 312, a cross bleed valve 314, and ECS valves 316, 318.

Figure 4:
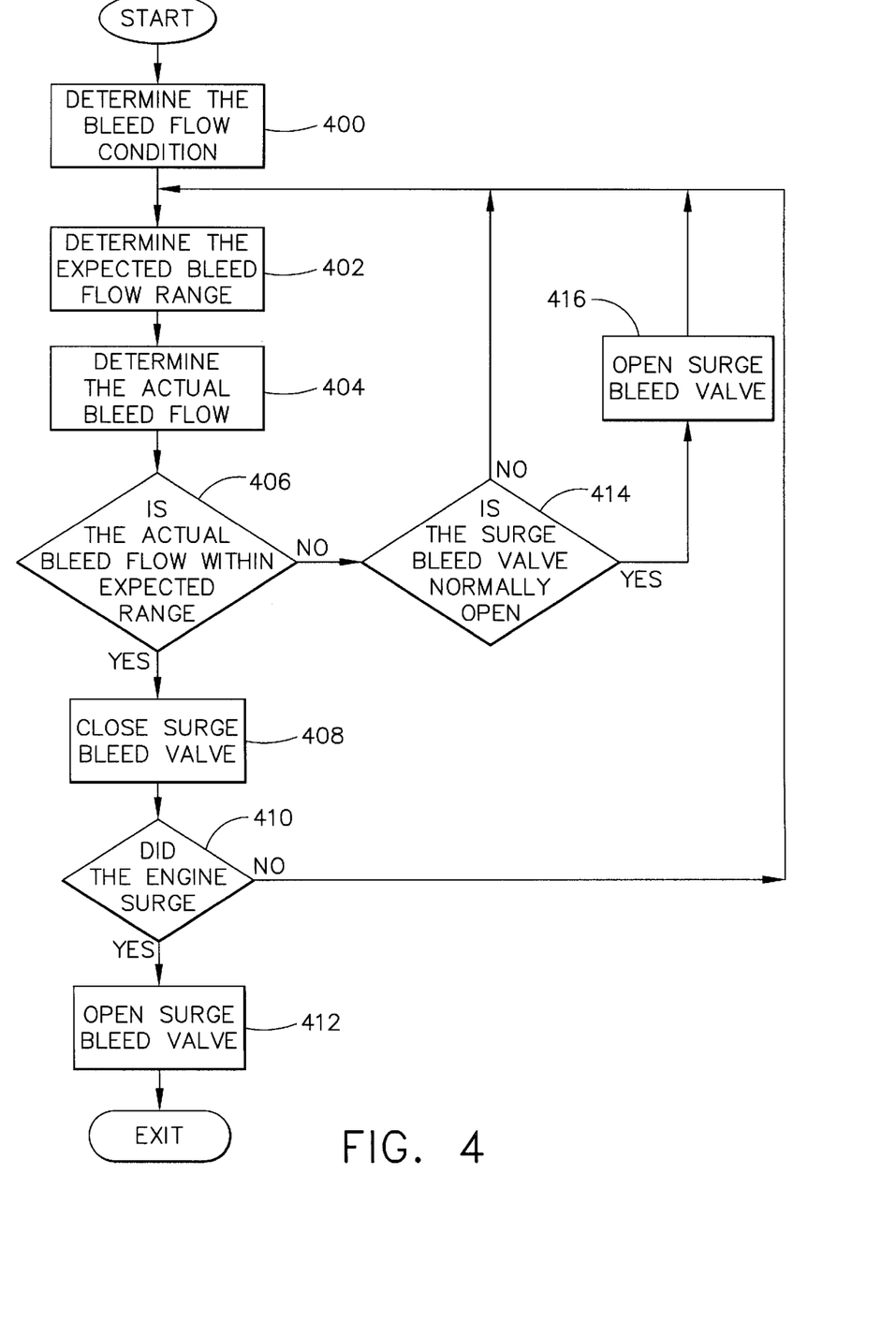
FIG. 4 illustrates a top level flowchart of the Smart Surge Bleed Valve System, according to a preferred embodiment of the present invention.

FIG. 4 illustrates the top level flowchart of the method embodiment of the Smart Surge Bleed Valve System of the present invention, and the system operational steps. In step 400, the appropriate Smart Surge Bleed Valve System module determines the bleed flow condition type, according to the ECS flow condition determined by the engine control system FADEC. The FADEC receives position information on the left and right engine bleed valves 306, 308, as well as the left and right ECS valves 316, 318, from the Data Concentrator Unit (DCU). The valve positions are read directly by the DCU. The four valve positions indicate five ECS flow conditions, a no engine ECS flow condition, and a valve position fault condition, as shown in FIGS. 5–11.

Figure 5:
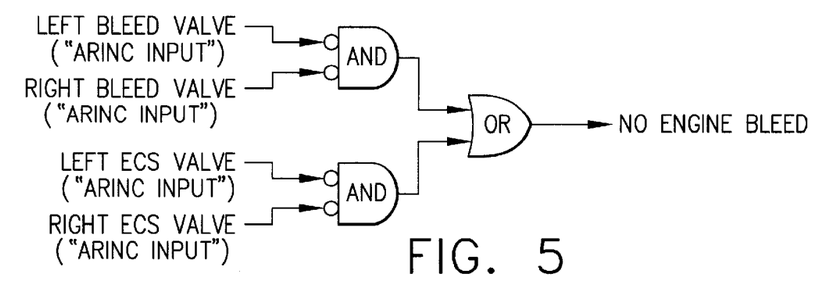
FIG. 5 illustrates a logic diagram for detection of a smart bleed condition of no engine bleed, according to a preferred embodiment of the present invention.

FIG. 5 illustrates a logic diagram for detection of a smart bleed condition of no engine bleed. In this case, either both ECS valves 316, 318 or both engine bleed valves 310, 312 are closed.

Figure 6:
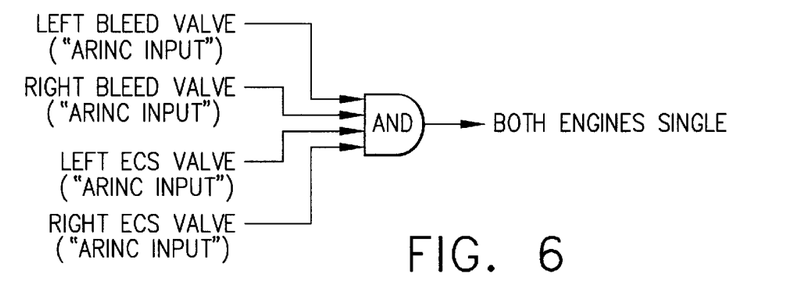
FIG. 6 illustrates a logic diagram for detection of a smart bleed condition of both engines single bleed, according to a preferred embodiment of the present invention.

FIG. 6 illustrates a logic diagram for detection of a smart bleed condition of both engines single bleed. In this case, all four valves 310, 312, 316, 318 are open, and cross bleed valve 314 is not needed and thus closed, producing the "single" bleed condition.

Figure 7:
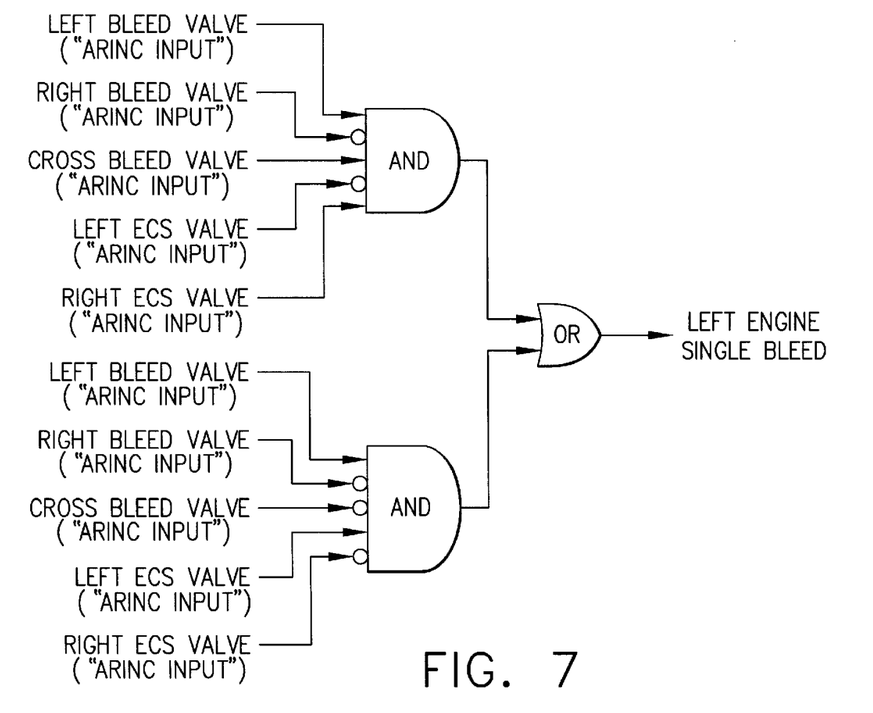
FIG. 7 illustrates a logic diagram for detection of a smart bleed condition of left engine single ECS bleed, according to a preferred embodiment of the present invention.

FIG. 7 illustrates a logic diagram for detection of a smart bleed condition of left engine single ECS bleed. In this case, the left engine bleed valve 310 is opened but only a single ECS is working. If the left ECS valve 316 is not opened, the cross bleed valve 314 is used to send air to the right ECS 304.

Figure 8:
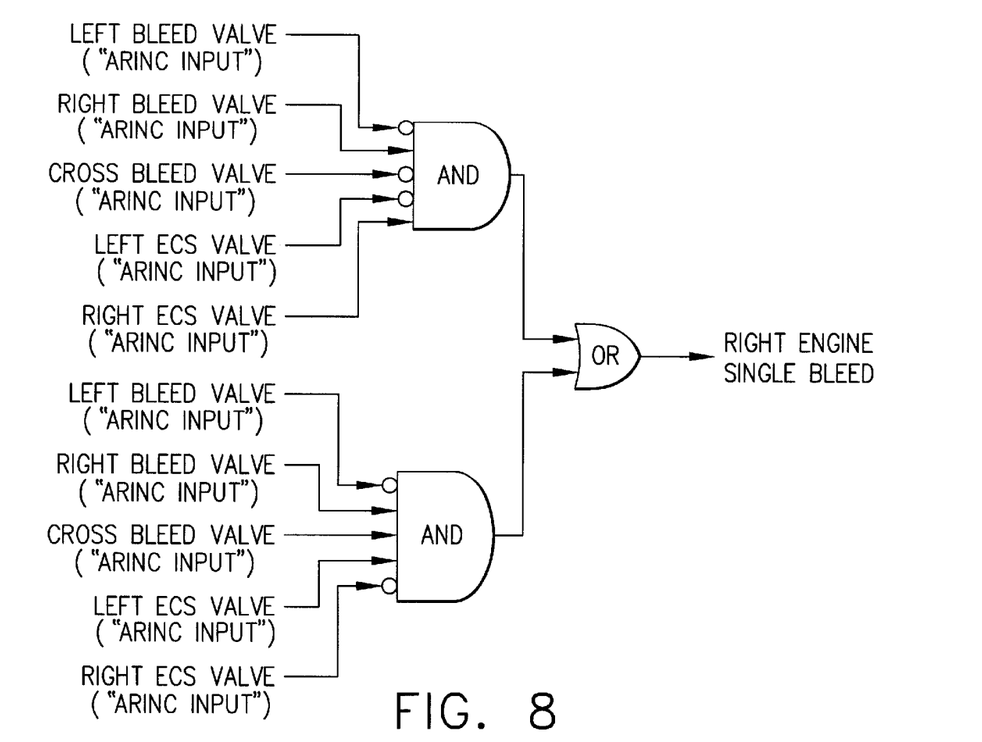
FIG. 8 illustrates a logic diagram for detection of a smart bleed condition of right engine single ECS bleed, according to a preferred embodiment of the present invention.

FIG. 8 illustrates a logic diagram for detection of a smart bleed condition of right engine single ECS bleed. In this case, the right engine bleed valve 312 is opened but only a single ECS is working. If the right ECS valve 318 is not working, the cross bleed valve 314 is used to send air to the left ECS 302.

Figure 9:
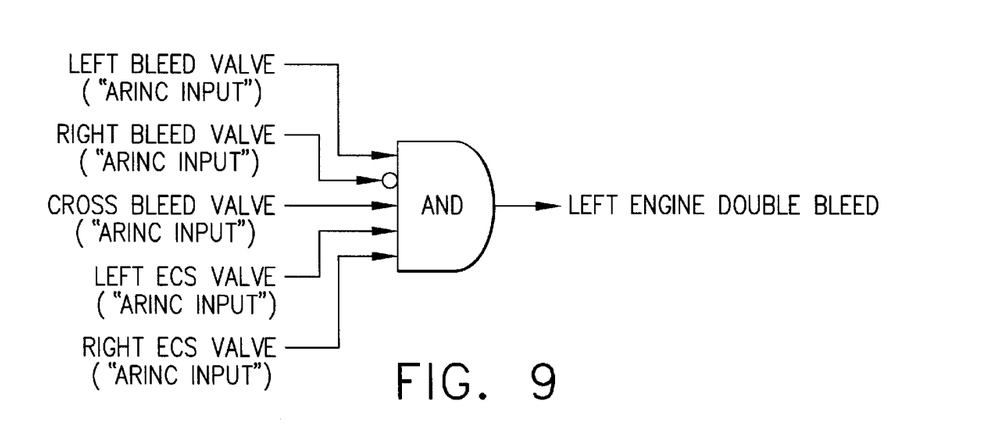
FIG. 9 illustrates a logic diagram for detection of a smart bleed condition of left engine "double" (or high) ECS bleed, according to a preferred embodiment of the present invention.

FIG. 9 illustrates a logic diagram for detection of a smart bleed condition of left engine "double" (or high) ECS bleed. In this case, the right engine bleed valve 312 is closed, but both ECS valves 316, 318 and the cross bleed valve 314 are opened.

Figure 10:
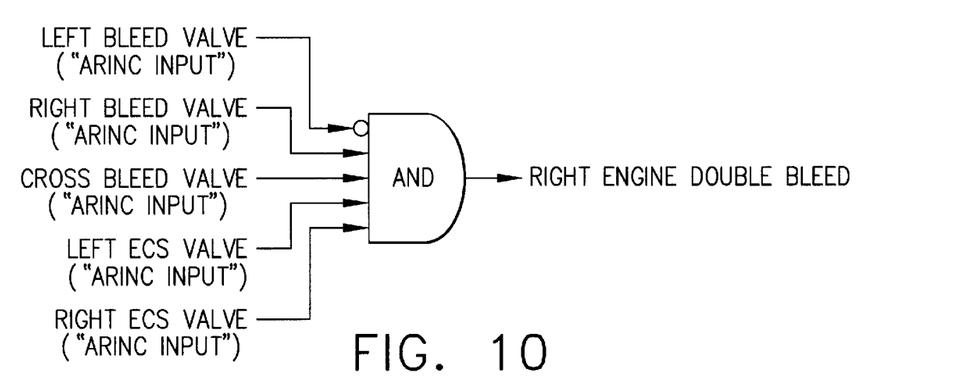
FIG. 10 illustrates a logic diagram for detection of a smart bleed condition of right engine "double" (or high) ECS bleed, according to a preferred embodiment of the present invention.

FIG. 10 illustrates a logic diagram for detection of a smart bleed condition of right engine "double" (or high) ECS bleed. In this case, the left engine bleed valve 310 is closed, but both ECS valves 316, 318 and the cross bleed valve 314 are opened.

Figure 11:
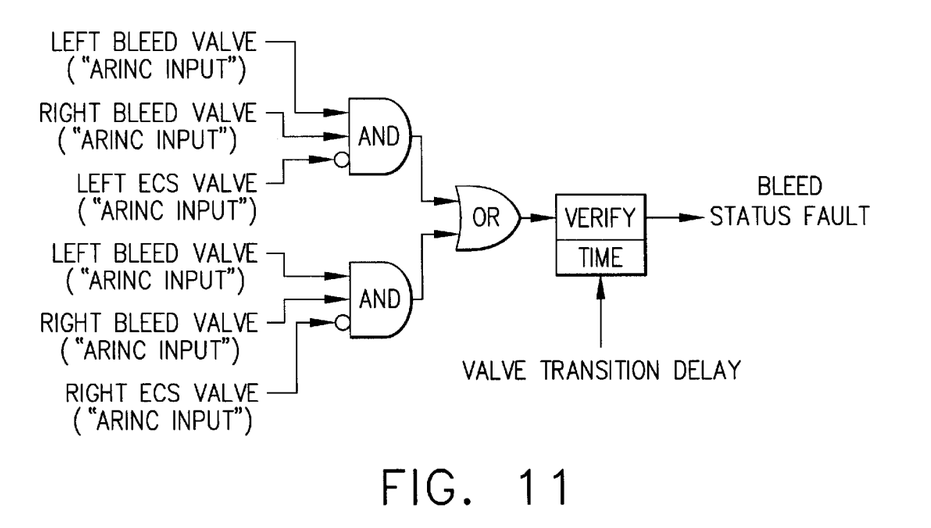
FIG. 11 illustrates a logic diagram for detection of a smart bleed status fault condition, according to a preferred embodiment of the present invention.

FIG. 11 illustrates a logic diagram for detection of a smart bleed status fault condition used to determine the ECS valve position fault condition. In this case, the ECS valves 316, 318 are not working and thus faulty. A time delay is introduced to allow for the ECS valve transition delay.

Figure 12:
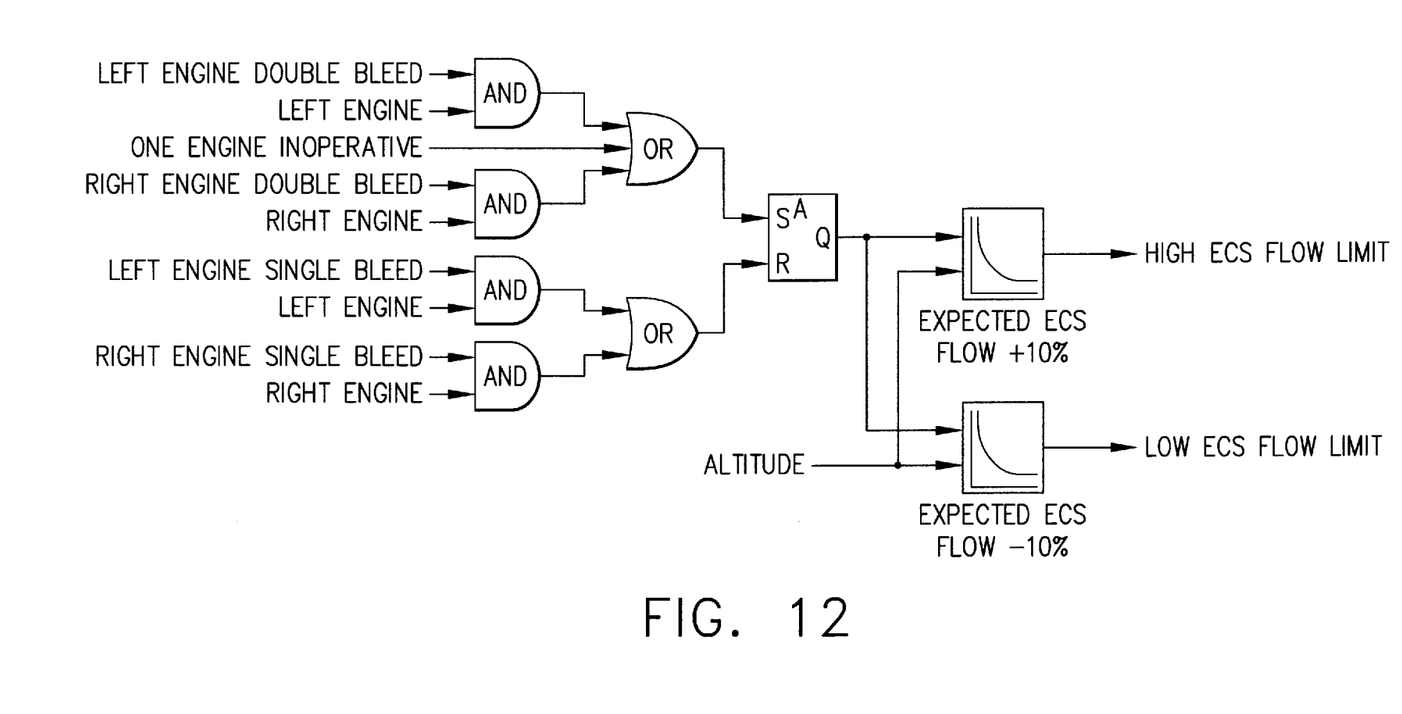
FIG. 12 illustrates a logic diagram for determining low and high ECS flow limit boundaries, according to a preferred embodiment of the present invention.
Figure 13:
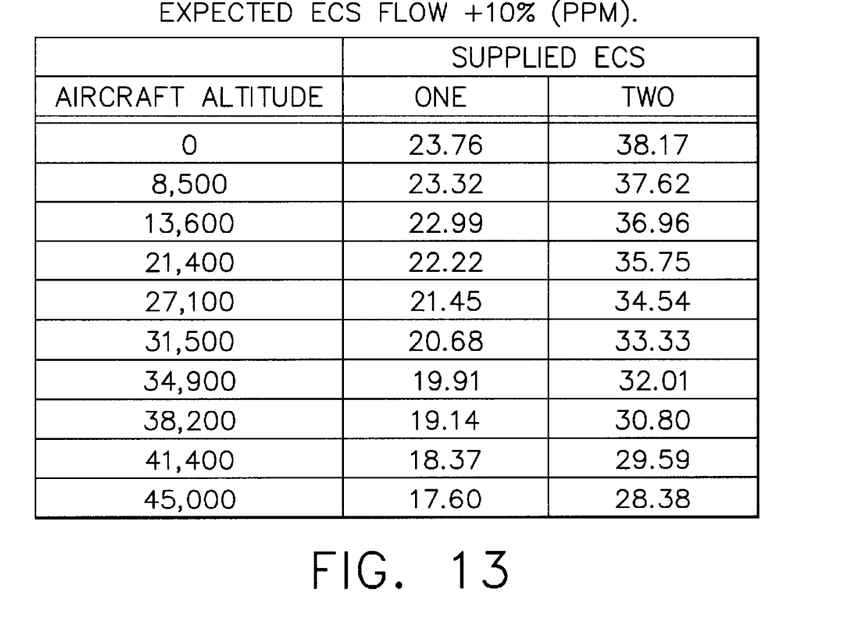
FIG. 13 shows the table of expected ECS flow +10% margin, useable for both engines, according to a preferred embodiment of the present invention.
Figure 14:
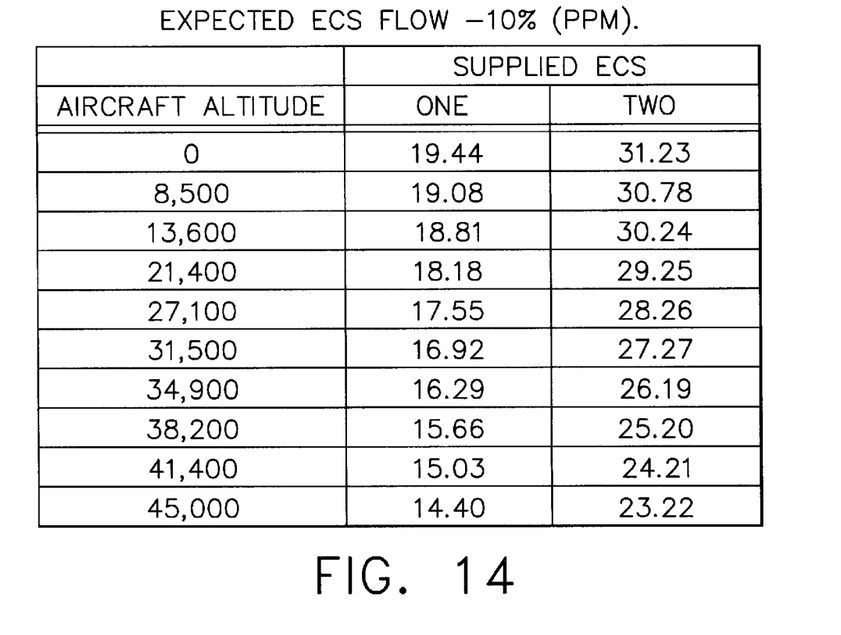
FIG. 14 shows the table of expected ECS flow −10% margin, useable for one engine, according to a preferred embodiment of the present invention.

Returning now to FIG. 4, in step 402 the expected bleed flow range is determined by the appropriate Smart Surge Bleed Valve System module of the present invention. The logic diagram of this module for determining low and high ECS flow limit boundaries is shown in FIG. 12. The ECS flow schedule versus altitude is coded into the engine FADEC controller software table. The values coded into the table are set with +–10% margin from the normal flow values. The coded values become the flow expected value used by the Smart Surge Bleed Valve System module at any time and altitude during the flight. For example, the optimal air flow accuracy between 0 and 42 lb/min is +–2 lb/min throughout the flight envelope. The module of the present invention within the engine FADEC controller shall determine the expected ECS flow values, according to the FADEC tables shown in FIGS. 13 and 14. FIG. 13 shows the table of expected ECS flow +10% margin, useable for both engines. FIG. 14 shows the table of expected ECS flow –10% margin, useable for one engine. The values depend on the aircraft altitude and whether one or both ECSs 302, 304 are working.

Returning again to FIG. 4, in step 404 the actual bleed flow values range is determined by the appropriate Smart Surge Bleed Valve System module of the present invention. The Integrated Air System Controller (IASC) provides the actual amount of air flow going to the left and right ECS 302, 304, as separate values, to the Smart Surge Bleed Valve System module in the engine FADEC.

In step 406 of FIG. 4, it is determined, by the appropriate Smart Surge Bleed Valve System module, whether the actual bleed flow is within the expected range. The module compares the reported actual flow value against the determined boundary limits. While the reported ECS flow is within the boundaries, the reported flow value is used as an input to the control of the surge bleed valve. If the reported flow value falls outside the determined boundary limits, or an engine surge occurs, or the valve positions report a faulty condition, the Smart Surge Bleed Valve System is disabled until the next cold boot of the engine control system.

Figure 15:
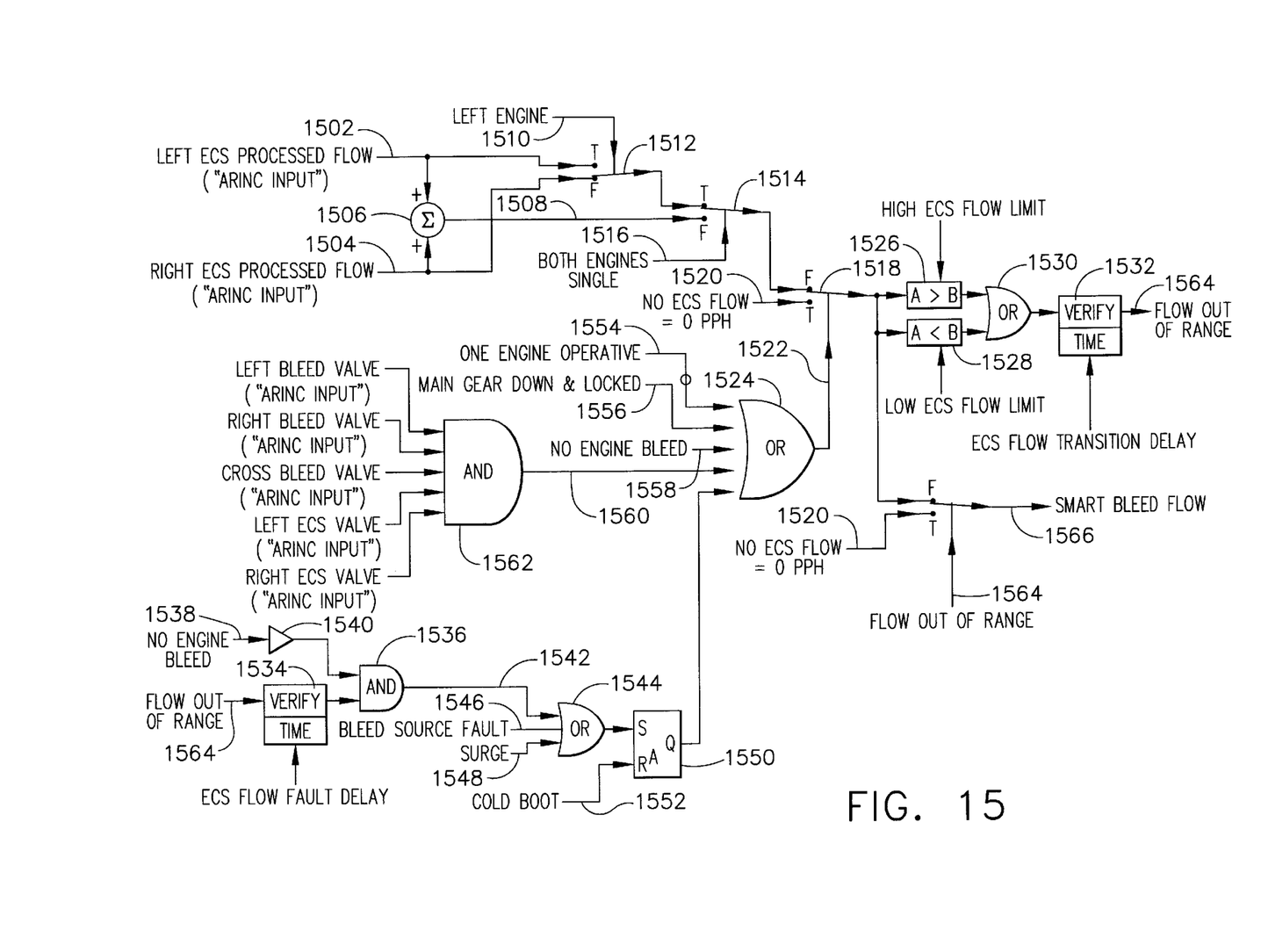
FIG. 15 illustrates a logic diagram used by the engine FADEC controller to determine the smart bleed flow value, according to a preferred embodiment of the present invention.

FIG. 15 illustrates a logic diagram used by the engine FADEC controller to determine the smart bleed flow value, described in steps 404 and 406 above. In this system, a left ECS valve processing flow value signal 1502 is summed in a summing circuit 1506 with a right ECS valve processing flow value signal 1504 to form a total aircraft flow value signal 1508. The left ECS valve processing flow value signal 1502 or the right ECS valve processing flow value signal 1504 is used with a left engine valve signal in a switch 1512 to determine the flow when there is a left or right engine single ECS bleed condition of FIGS. 7 and 8.

In a switch 1514, the output from the switch 1512, the signal 1508 and a both engines single ECS signal 1516 are used to determine if the flow in both engines represents a single bleed condition of FIG. 6, or left or right engine "double" (or high) ECS bleed condition of FIGS. 9 and 10.

In a switch 1518, it is determined whether the flow from the switch 1514 should be used in checking whether the flow is within an expected range, or whether the Smart Surge Bleed Valve System should not be used and the surge bleed valve should be opened, depending on whether there is no ECS flow signal 1520 or a signal 1522 from an OR 1524 element is True.

The flow value from the switch 1518 is compared with the low and high ECS flow expected limits in elements 1526, 1528. If it is determined, in OR element 1530, that the flow is outside the limits, after a delay induced in an element 1532, that means that the flow is still outside the range and a flow out of range signal is set to True. If the signal is verified after a delay in element 1534 (of preferably 2 seconds), the flow out or range signal is forwarded to an AND element 1536. A no engine bleed signal is inverted in element 1540, and if the no engine bleed signal is False it becomes True, indicating that there is engine bleed. If both the signal from element 1540 and the signal from 1534 are True, then a signal 1542 leaving the AND element 1536 will be True. The signal 1542 enters an OR element 1544, with a bleed source fault signal 1546, and a surge signal 1548. If either of these signals is True, a True signal is sent from the OR element 1544 to an element 1550, which is an SQR. When the FADEC is cold booted, the output of the element 1550 is set to False. However, a True signal from the element 1544 will cause the SQR output to change from False to True. This signal enters the OR element 1524, together with a one engine inoperative signal 1554, a main gear down and locked signal 1556, a no engine bleed signal 1558 and all five valves open signal 1560, from an AND element 1562, to determine if the flow should be compared with the high and low ECS flow limits in the elements 1526, 1528. If so, there is ECS flow and if the flow out of range signal 1564 is false, a smart bleed flow signal 1566 is True. In this case all the conditions have been satisfied and the use of the Smart Surge Bleed Valve System of the present invention is allowed, so the surge bleed valve is closed.

Returning now to FIG. 4, if the actual bleed flow is within the expected range, in step 408 the signal for closing the surge bleed valve is set True and the Smart Surge Bleed Valve System returns to step 402, to perform the calculations for the new altitude. If the actual bleed flow is not within the expected range, in step 414 it is tested whether the surge bleed valve is normally open, and if not, the system returns to step 402. If the surge bleed valve is normally open, in step 416 the surge bleed valve is caused to be opened by setting the signal for closing the surge bleed valve to False, and the system returns to step 402.

There is a separate module in the Smart Surge Bleed Valve System which, when an engine surge is detected, commands the surge bleed valves to open. The surge detection and recovery circuit of an engine control system has higher authority than the Smart Surge Bleed Valve System of the present invention. Therefore, if the actual bleed flow is not within the expected range, the Smart Surge Bleed Valve System calls the Smart Surge Bleed Valve System accommodation module to perform surge or detection accommodation. In step 410 it is tested whether the engine surge occurred, and if so, in step 412 the signal for closing the surge bleed valve is set False to cause the surge bleed valve to open, and the system exits. If there was no surge, the system returns to step 402, to perform the calculations for the new altitude.

The system monitors the data from the IASC to validate the input bleed extraction values. The validation consists of checking the reported bleed extraction actual value against the expected value. For example, the expected value for two engines sharing the bleeding load ranges linearly from 21.6 ppm at sea level to 16 ppm at 45,000 feet, and the expected value for single engine bleed ranges linearly from 34.7 ppm at sea level to 25.8 ppm at 45,000 feet. The value reported by IASC is compared against the expected value. The value reported by the IASC is declared invalid if it varies more than 10% from the expected value high or low. Within the +−10% window around the expected value, the Smart Surge Bleed Valve System accommodation module accommodates for incorrect data received from the IASC.

All the logic diagrams of the preferred embodiments of the present invention, presented in FIGS. 5–12, and 15, may be implemented either in a computer software program, including a set of computer-executable program instructions executed within the engine control system, or in electronic circuits located within the engine control system.

The present invention is applicable to all gas turbine engines which use surge bleed valves, engine bleed offtakes and electronic engine controls. It has been noticed that the use of the present invention reduces fuel consumption by about 4%. Moreover, it lowers aircraft acoustic signatures.

It should be understood, of course, that the foregoing relates to preferred embodiments of the invention and that modifications may be made without departing from the spirit and scope of the invention as set forth in the following claims.

I claim:

1. A method for reducing aircraft engine fuel consumption by selectively closing an aircraft surge bleed valve (SBV), when the surge bleed valve would normally be open, comprising the following steps:

(a) determining whether an engine bleed flow obtained with a closed SBV is sufficient to prevent engine surge for a present flight regime; and (b) if so, keeping the SBV closed, while the aircraft is drawing air from the engine.

2. The method according to claim 1, wherein the determining step (a) further comprises the steps of:
   (c) determining an engine bleed flow condition type;
   (d) determining an engine bleed flow expected range, according to an aircraft altitude and configuration, and engine bleed flow condition type;
   (e) determining an actual engine bleed flow value; and
   (f) determining whether the actual bleed flow value is within the engine bleed flow expected range.

3. The method according to claim 1, wherein the method is implemented in a software program including a set of computer-executable program instructions executed within an engine control system.

4. The method according to claim 3, wherein the engine control system is a Full Authority Digital Electronic Control (FADEC).

5. The method according to claim 1, wherein the method is implemented in electronic circuits located within an engine control system.

6. The method according to claim 5, wherein the engine control system is a Full Authority Digital Electronic Control (FADEC).

7. A system for reducing aircraft engine fuel consumption by selectively closing an aircraft surge bleed valve (SBV), when the surge bleed valve would normally be open, comprising:
   means for determining whether an engine bleed flow obtained with a closed SBV is sufficient to prevent engine surge for a present flight regime; and
   means for keeping the SBV closed, while the aircraft is drawing air from the engine.

8. The system according to claim 7, wherein the determining means further comprises:
   means for determining an engine bleed flow condition type;
   means for determining an engine bleed flow expected range, according to an aircraft altitude and configuration, and engine bleed flow condition type;
   means for determining an actual engine bleed flow value; and
   means for determining whether the actual bleed flow value is within the engine bleed flow expected range.

9. The system according to claim 7, wherein the system is implemented in a computer software program including a set of computer-executable program instructions executed within an engine control system.

10. The system according to claim 9, wherein the engine control system is a Full Authority Digital Electronic Control (FADEC).

11. The system according to claim 7, wherein the system is implemented in electronic circuits located within an engine control system.

12. The system according to claim 11, wherein the engine control system is a Full Authority Digital Electronic Control (FADEC).

* * * * *